United States Patent
Naroff et al.

(10) Patent No.: US 7,743,371 B1
(45) Date of Patent: Jun. 22, 2010

(54) SYSTEM AND METHOD FOR DYNAMICALLY LOADING OBJECT MODULES

(75) Inventors: Steve Naroff, San Jose, CA (US); Kevin Enderby, Redwood City, CA (US); Nick Kledzik, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 937 days.

(21) Appl. No.: 10/797,515

(22) Filed: Mar. 10, 2004

(51) Int. Cl.
*G06F 9/44* (2006.01)
(52) U.S. Cl. ........................ 717/162; 719/331
(58) Field of Classification Search ................ 717/162; 719/331
See application file for complete search history.

(56) References Cited

U.S. PATENT DOCUMENTS

| | | | | |
|---|---|---|---|---|
| 4,787,034 A * | 11/1988 | Szoke | ........................ | 719/331 |
| 5,150,474 A * | 9/1992 | Kaneko | ........................ | 717/138 |
| 5,293,630 A * | 3/1994 | Tatge et al. | ........................ | 718/100 |
| 6,112,025 A * | 8/2000 | Mulchandani et al. | ...... | 719/331 |
| 6,434,685 B1 * | 8/2002 | Sexton et al. | ........................ | 711/206 |
| 6,701,515 B1 * | 3/2004 | Wilson et al. | ........................ | 717/117 |
| 6,813,764 B2 * | 11/2004 | Stoodley | ........................ | 717/153 |
| 2004/0260911 A1 * | 12/2004 | Chauvel et al. | ........................ | 712/216 |

OTHER PUBLICATIONS

Apple Developer Connection, Apple Computer, Inc. 2001.*
Apple Developer Connection 2001.*

* cited by examiner

*Primary Examiner*—Wei Y Zhen
*Assistant Examiner*—Phillip H Nguyen
(74) *Attorney, Agent, or Firm*—Schwegman, Lundberg & Woessner, P.A.

(57) ABSTRACT

A system and method for dynamically loading object modules is described herein. In one embodiment, the method comprising loading a first set of instructions into a memory unit, wherein the first set of instructions includes an unresolved reference to a second set of instructions, and wherein the loading includes replacing the unresolved reference with an address of a third set of instructions. The method also includes executing instructions of the first set and executing instructions of the third set to determine the address of the second set. The method also includes loading instructions of the second set into the memory unit, after determining the address of the second set. Additionally, the method includes executing instructions of the second set.

45 Claims, 10 Drawing Sheets

SYSTEM AND METHOD FOR DYNAMICALLY LOADING OBJECT MODULES

FIELD

This invention relates generally to the field of software data processing and more particularly to computer operating systems.

BACKGROUND

Static computer programming languages such as C, C++, Objective-C, and other C dialects typically require application programs to be compiled and linked before they are executable. In particular, according to the traditional static application development method, there are two main steps to building an application: 1) a compiler reads each source code file and produces an object file for each of the source code files; 2) a linker reads all the object files and combines them into a single application program. One disadvantage of the traditional static application development method is that the linker processes all the object files regardless of whether they will be called when the application program executes. As such, during application program development, time is spent linking object files that may not be used at runtime.

Dynamically linking statically compiled languages can reduce some of the linker overhead described above. One prior art dynamic linking technique calls for dynamically linking object file libraries at run-time. However, this prior art technique requires that unresolved references (e.g., external function calls, references to external variables, etc.) be verified with symbols in an object file library interface, prior to run-time. One disadvantage of this prior art technique is that time is spent verifying unresolved references that may never be called at run-time.

SUMMARY

A system and method for dynamically loading object modules is described herein. In one embodiment the system comprises a memory unit. In the system, the memory unit includes a compiler unit to create an executable object module based on a source code module, wherein the executable object module includes an unresolved reference to a separately compiled object module. The memory unit also includes a loader unit to present the executable object module for execution, wherein the loader unit is to replace the unresolved reference with a reference to a system module, and wherein the loader unit is not to determine whether the unresolved reference refers to a defined external object module. The system also includes a processor to receive the executable object module from the loader unit of the memory unit.

In one embodiment, the method comprising loading a first set of instructions into a memory unit, wherein the first set of instructions (e.g., an executable object module) includes an unresolved reference to a second set of instructions (e.g., another object module), and wherein the loading includes replacing the unresolved reference with an address of a third set of instructions (e.g., a loader unit). The method also includes executing instructions of the first set and executing instructions of the third set to determine the address of the second set. The method also includes loading instructions of the second set into the memory unit, after determining the address of the second set. Additionally, the method includes executing instructions of the second set.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for dynamically loading object modules are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

This description of the embodiments is divided into four sections. In the first section, a system level overview is presented. In the second section, an exemplary implementation is described. In the third section, methods for using exemplary embodiments are described. In the fourth section, an exemplary hardware and operating environment is described.

System Level Overview

This section provides a system level overview of exemplary embodiments of the invention.

Figure 1:
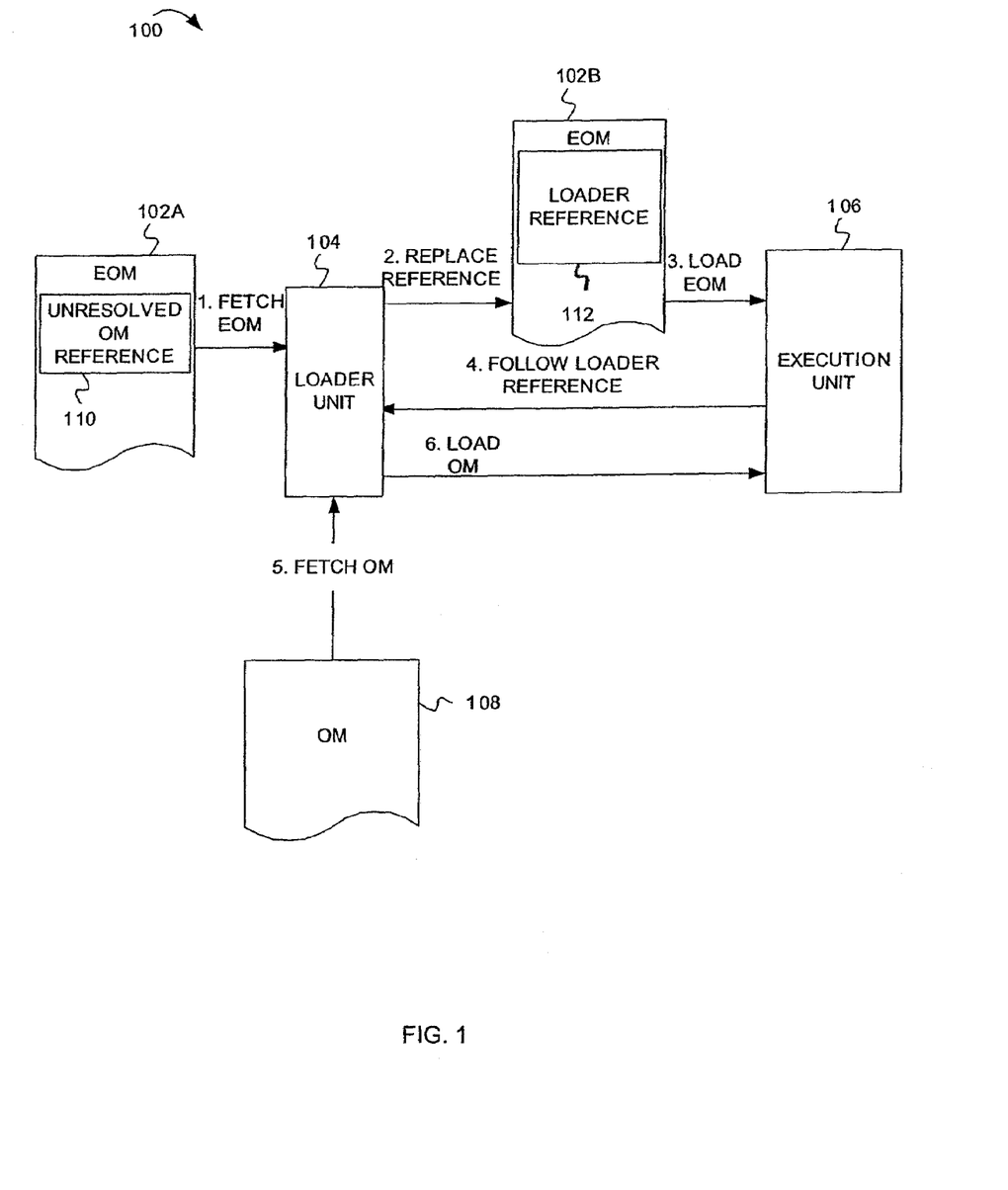
FIG. 1 is a data flow diagram illustrating data flow and operations for dynamically loading and executing object modules, according to exemplary embodiments of the invention.

FIG. 1 is a data flow diagram illustrating data flow and operations for dynamically loading and executing a set of object modules, according to embodiments of the invention. In FIG. 1, the computer system 100 includes a loader unit 104 and an execution unit 106, which perform operations for dynamically loading and executing a set of object modules. These operations and the associated data flow will be described in six stages.

Before describing the six stages, it should be understood that an application program typically includes an executable object module and one or more additional object modules. Many of the additional object modules may not be called for execution when the application program is executed. For example, an application program's error-handling object modules will execute only when certain system errors occur. If the system errors do not occur, the application program's error-handling object modules do not execute. If a computer system loaded and resolved references for every object module prior to runtime, it could spend time processing object modules that are not executed.

According to embodiments of the invention, when an application program is launched, the computer system 100 loads only the object module that is currently needed for program execution. Because the computer system 100 does not load object modules until they are called at runtime, the computer system 100 does not spend time loading and resolving references for object modules that may never be called during program execution. As a result, the computer system 100 can launch applications relatively quickly.

Now turning to the six stages, during stage one, the loader unit 104 fetches an executable object module 102A, which is part of an application program. The executable object module 102A includes an unresolved reference to another object module (shown as unresolved OM reference 110). The unresolved object module reference 110 can be a call to a function that resides in the object module 108.

During stage two, the loader unit 104 replaces the unresolved object module reference 110 with a loader reference 112, which is a reference to instructions within the loader unit 104. Replacing the unresolved object module reference 110 with the loader reference 112 allows the loader unit 104 to resolve the unresolved object module reference and load the object module 108 at runtime. Thus, the computer system 100 postpones overhead associated with resolving references and loading object modules until runtime.

During stage 3, the loader unit 104 loads the executable object module 102B into the execution unit 106, which begins executing the executable object module 102B. While executing the executable object module 102B, the execution unit 106 encounters the loader reference 112, which transfers program control to the loader unit 104 (stage 4). During stage 5, while the loader unit 104 has program control, it determines that the unresolved object module reference 110 was a reference to object module 108 and it fetches the object module 108. During stage six, the loader unit 104 loads the object module 108 into the execution unit 106, which executes instructions and/or accesses data contained within the object module 108.

Exemplary Implementation

Figure 2:
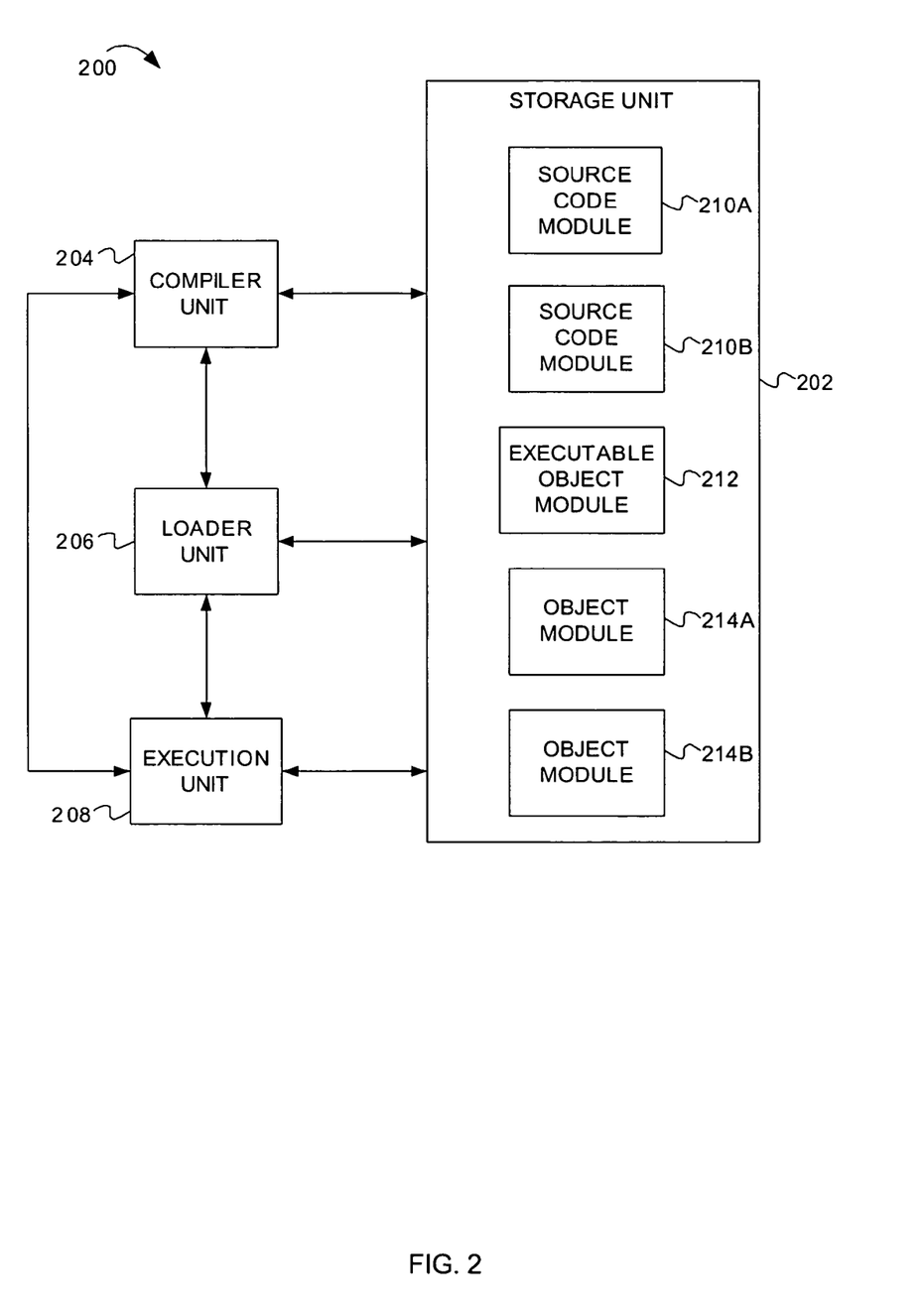
FIG. 2 is a block diagram illustrating a system for dynamically loading and executing object modules, according to exemplary embodiments of the invention.
Figure 3:
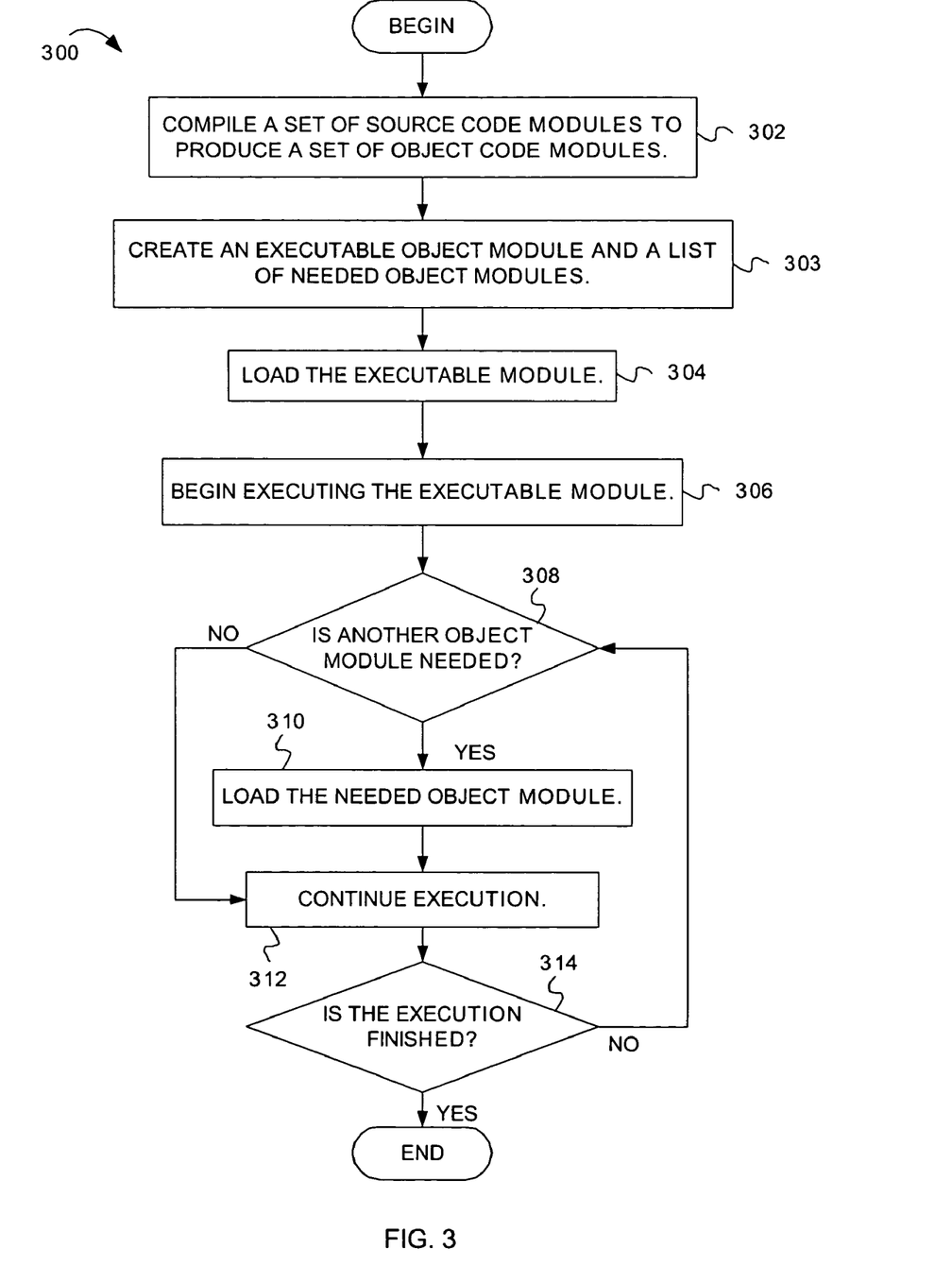
FIG. 3 is a flow diagram illustrating operations for compiling, loading, and executing object modules, according to exemplary embodiments of the invention.
Figure 4:
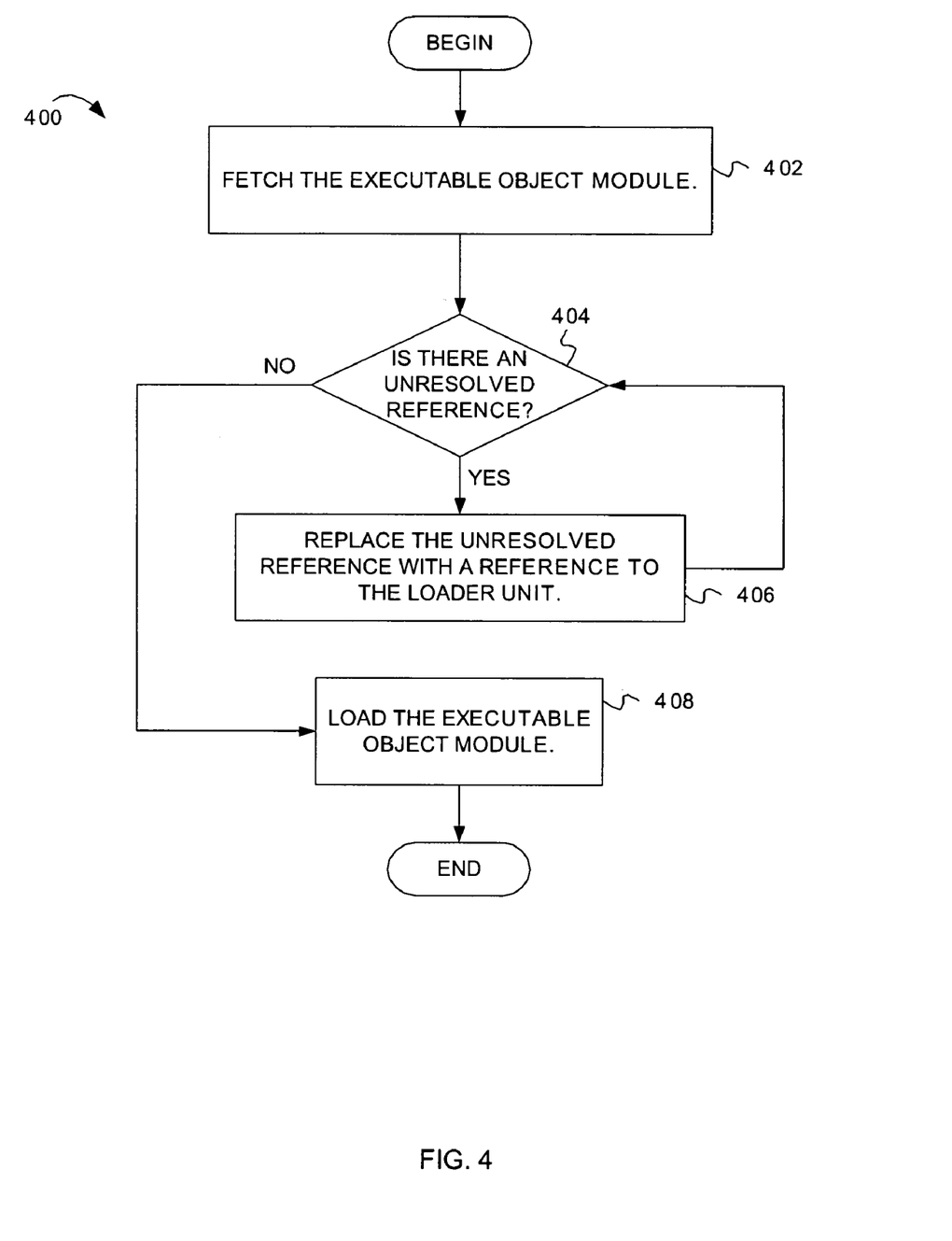
FIG. 4 is a flow diagram illustrating operations for loading an executable object module, according to exemplary embodiments of the invention.
Figure 5:
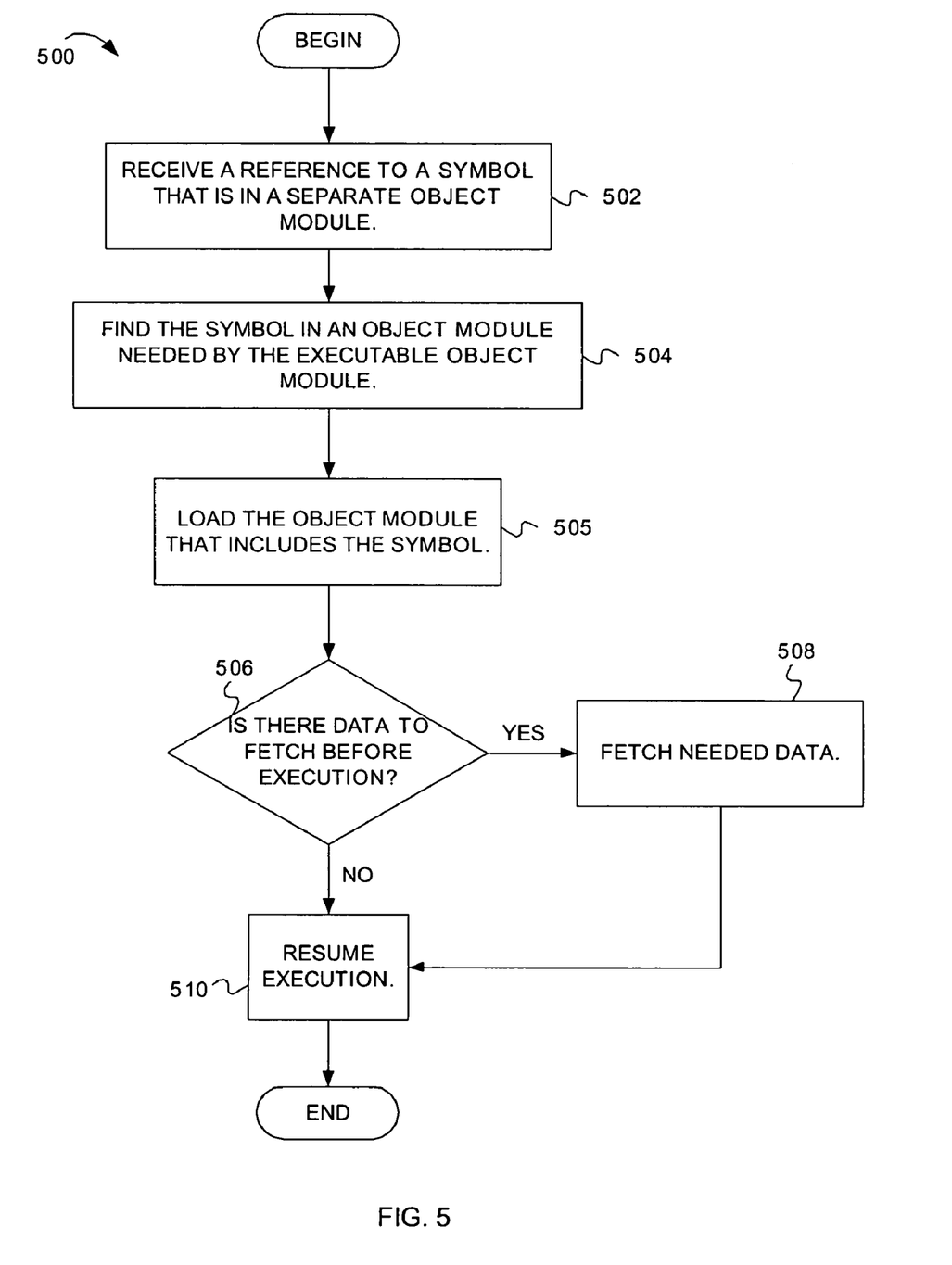
FIG. 5 is a flow diagram illustrating operations for loading a needed object module, according to exemplary embodiments of the invention.
Figure 6:
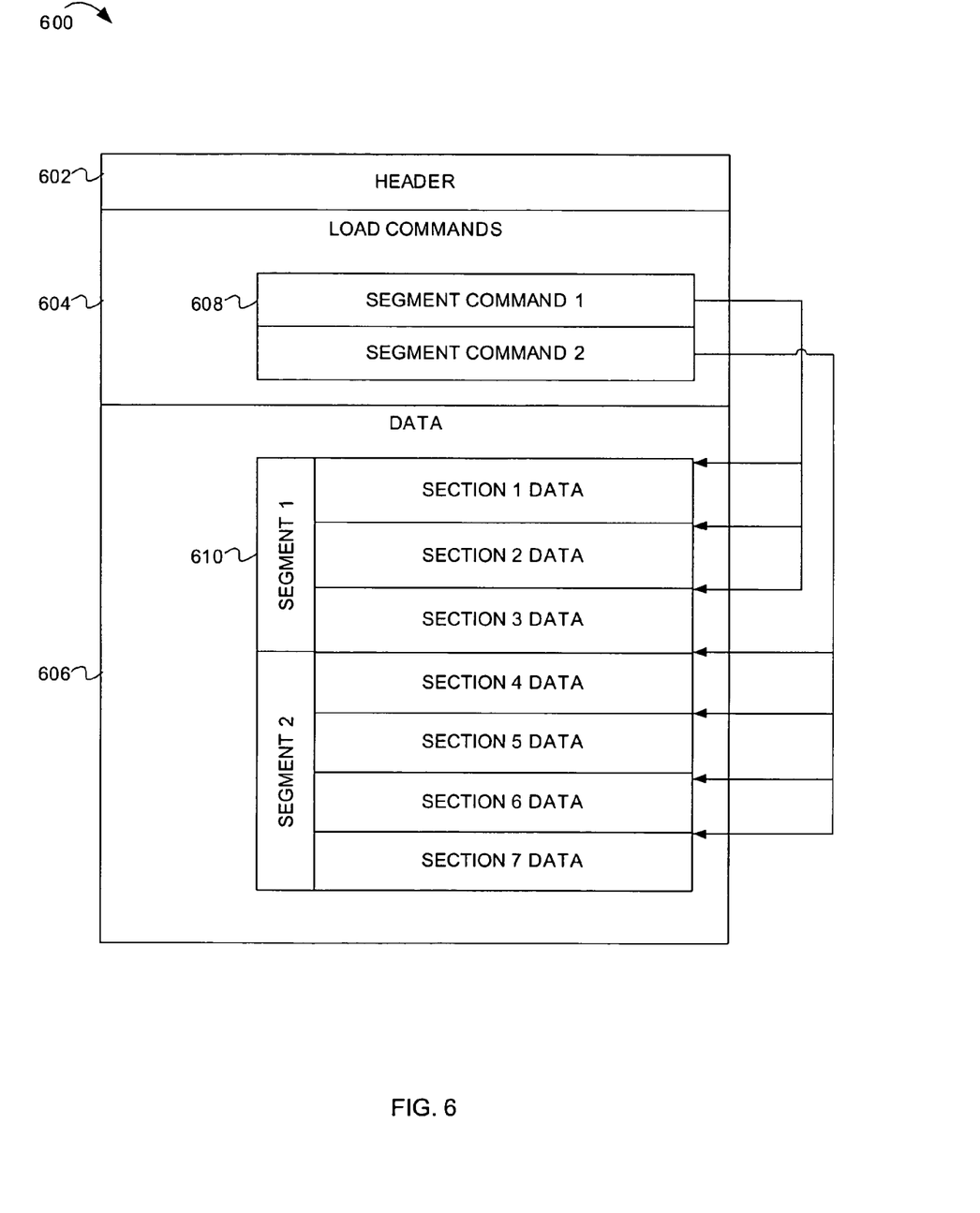
FIG. 6 is a block diagram illustrating an object module, according to exemplary embodiments of the invention.

This section describes an exemplary implementation of the invention. In this section, FIG. 2 shows an exemplary system architecture, while FIGS. 3-5 show operations performed by the exemplary system. FIG. 6 shows a format of an exemplary object module.

FIG. 2 is a block diagram illustrating a system for dynamically loading and executing object modules, according to exemplary embodiments of the invention. As shown in FIG. 2, the system 200 includes a compiler unit 204, which is communicatively coupled with a loader unit 206 and an execution unit 208. The loader unit 206 is also communicatively coupled with the execution unit 208. The compiler unit 204, loader unit 206, and execution unit 208 are all communicatively coupled to a storage unit 202. The storage unit includes source code modules 210A-210B, object modules 214A-214B, and an executable object module 212.

In one embodiment, the loader unit 206 is a system module or system subroutine contained within an operating system (not shown) that is running on the execution unit 208. In one embodiment, the loader unit 206 is dyld, which is a dynamic loader available from Apple Computer, Inc. of Cupertino, Calif. In one embodiment, the operating system is the Macintosh Operating System, which also available from Apple Computer, Inc.; however, embodiments are not limited to any particular operating system.

In one embodiment, the compiler unit 204 is a high-level language compiler. For example, in one embodiment, the compiler unit 204 compiles source code modules containing C programming language instructions. Alternatively, the compiler unit 204 compiles other statically compiled programming languages such as any dialect of the C programming language, including C++ and Objective C. Alternatively, the compiler unit 204 can compile any other suitable statically compiled programming language. In one embodiment, the compiler unit includes Xcode, which is part of the Mac OS X Development Environment. Mac OS X Development Environment is available from Apple Computer, Inc.

Figure 10:
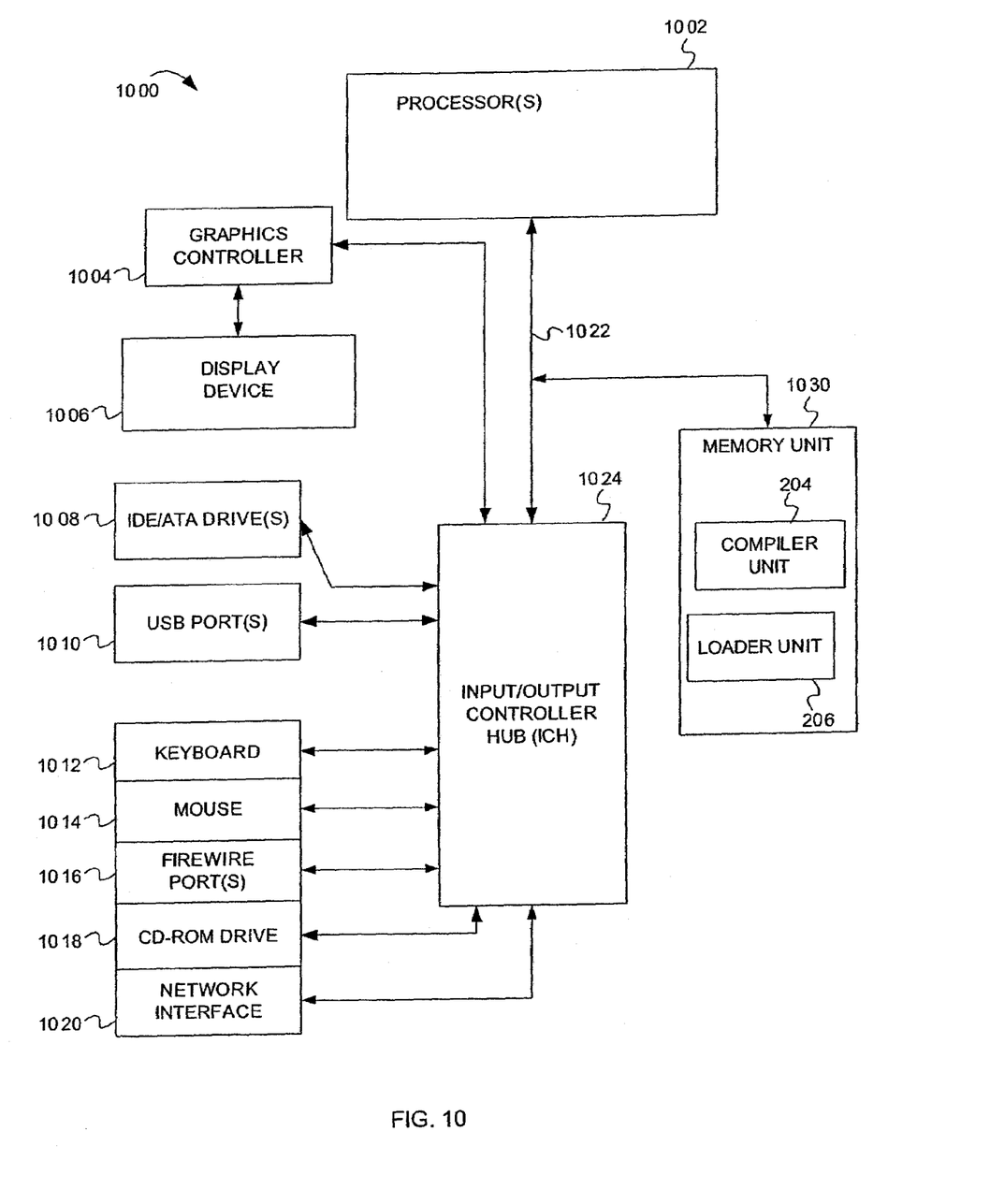
FIG. 10 illustrates an exemplary computer system used in conjunction with certain embodiments of the invention.

In one embodiment, the execution unit 208 includes any processors and memory devices (e.g., see FIG. 10—processor(s) 1002 and memory unit 1030) needed for executing an object module (i.e., an application program). In one embodiment, the storage unit 202 is a secondary storage device such as a disk drive (e.g., see FIG. 10—IDE/ATA drive(s) 1008) or flash RAM device. Alternatively, the storage unit 202 can include any other suitable storage device.

In one embodiment, the source code modules 210A-210B include high-level programming language instructions written in a statically compiled programming language such as C, C++, Objective C, or any other suitable programming language. In one embodiment, the source code modules 210A-210B are text files, while in alternative embodiments, they are stored in any other suitable file format. According to one embodiment, the object modules 214A-214B are files in the Mach-O object format. According to embodiments, the storage unit 202 can include any number of source code modules and object modules.

It should be understood that the functional units (e.g., the compiler unit 204, loader unit 206, etc.) of the system 200 can be integrated or divided, forming a lesser or greater number of functional units. Moreover, the functional units can be communicatively coupled using any suitable communication method (e.g., message passing, parameter passing, and/or signals through one or more communication paths etc.). Additionally, the functional units can be connected according to any suitable interconnection architecture (fully connected, hypercube, etc.). Any of the functional units used in conjunction with embodiments of the invention can include machine readable media including instructions for performing operations described herein. Machine-readable media include any mechanism that provides (i.e., stores and/or transmits) information in a form readable by a machine (e.g., a computer). For example, a machine-readable storage medium includes read only memory (ROM), random access memory (RAM), magnetic disk storage media, optical storage media, and flash memory devices. Examples of a machine-readable propagation medium include electrical, optical, acoustical or other forms of propagated signals (e.g., carrier waves, infrared signals, digital signals, etc.), etc. According to embodiments of the invention, the functional units can be other types of logic (e.g., digital logic) for executing the operations described herein.

While FIG. 2 presented an exemplary system architecture, FIGS. 3-6 will describe operations performed by the system.

FIG. 3 is a flow diagram illustrating operations for compiling, loading, and executing object modules, according to exemplary embodiments of the invention. The flow diagram of FIG. 3 will be described with reference to the exemplary system of FIG. 2. The flow diagram 300 commences at block 302.

At block 302, a set of source code modules is compiled to produce a set of object modules. For example, the compiler unit 204 compiles one or more source code modules to produce one or more object modules, which can be used as part of an application program. In one embodiment, in compiling the set of object modules, the compiler unit 204 fetches a source code module (e.g., source code module 210A) from the storage unit 202. Based on the source code module, the compiler unit 204 produces an executable object module (e.g., executable object module 212). The compiler unit 204 can repeatedly fetch source code modules and produce object modules any number of times, according to embodiments of the invention. In one embodiment, the compiler unit produces object modules in which internal code-to-data offsets are resolved. For example, the compiler determines address distances between code and data, so that data references are relative to the beginning of a code segment or relative to the beginning of the object module. Additionally, according to embodiments, the compiler unit 204 properly page-aligned code and data segments. That is, the compiler unit 204 produces code and data segments that do not span across page boundaries when stored in a virtual memory system. The flow continues at block 303.

At block 303, an executable object module and a list of needed object modules are created. For example, the compiler unit 204 creates an executable object module and a list of needed object modules. The complier unit 204 creates the list of needed object modules by finding in the executable object module unresolved references to other object modules. In one embodiment, the executable object module is a "stub" that includes the list of needed object modules. The stub also includes a call to the loader unit 204 to load the object module containing the program's driver function (e.g., in the C programming language, the main function). In an alternative embodiment, the executable object module includes the application program's driver function, while the list of needed object modules is stored separately. The flow continues at block 304.

At block 304, the executable object module is loaded. For example, the loader unit 206 fetches the executable object module 212 from the storage unit 202. After fetching the executable object module 212, the loader unit 206 loads the executable object module 212 into the execution unit 208. The operation shown in block 304 is described in greater detail below, with reference to FIG. 4. In one embodiment, creating and loading the executable object module does not include determining whether the unresolved reference refers to a properly defined external symbol. For example, creating and loading the executable object module does not include verifying external symbol references in a library interface. As such, the system 200 reduces overhead associated with processing object modules prior to runtime. From block 304, flow continues at block 306.

As shown in block 306, execution of the executable object module is initiated. For example, the execution unit 208 begins executing the executable object module 212. The flow continues at block 306.

At block 308, it is determined whether another object module is needed. For example, the execution unit 208 determines whether another object module is needed. In one embodiment, the execution unit 208 can determine whether another object module is needed based on an address included in the executing instruction. For example, if the executing instruction includes an unresolved reference (e.g., an address outside the address space of the executable object module), the execution unit 208 needs another object module. However, if the executing instruction does not include an address outside the address space of the executable object module, the execution unit 208 does not need another object module. If another object module is needed, the flow continues at block 310. Otherwise, the flow continues at block 312.

As shown in block 310, the needed object module is loaded. For example, the loader unit 206 fetches the needed object module (e.g., object module 214A) from the storage unit 202. After fetching the needed object module, the loader unit 206 loads the needed object module into the execution unit 208. The operation shown in block 310 is described in greater detail below, with reference to FIG. 5. From block 312, flow continues at block 314.

At block 312, execution is continued. For example, the execution unit 208 continues the execution by executing instructions of the needed object module. The flow continues at block 314.

At block 314, it is determined whether the execution is finished. For example, the execution unit 208 determines whether the execution is finished. In one embodiment, the execution unit 208 determines that the execution is finished when it encounters one or more instructions that indicate the program is finished (e.g., instructions that transfer control back to the operating system). If the execution is finished, the flow ends. Otherwise, the flow continues at block 308.

As noted above, the operations shown in FIG. 4 describe the operation of block 304 (see the description of FIG. 3 above) in greater detail. FIG. 4 is a flow diagram illustrating operations for loading an executable object module, according to exemplary embodiments of the invention. The operations of the flow diagram 400 will be described with reference to the exemplary system shown in FIG. 2. The flow diagram 400 commences at block 402.

As shown in block 402, the executable object module is fetched. For example, the loader unit 206 fetches the executable object module 212 from the storage unit 202. After fetching the executable object module 212, the loader unit 206 loads the executable object module 212 into the execution unit 208. The flow continues at block 404.

At block 404, it is determined whether there is an unresolved reference. For example, the execution unit 208 determines whether there is an unresolved reference in the executable object module 212. In one embodiment, an unresolved reference is a symbolic representation of an address outside the executable object module's address space. Unresolved references can be resolved by replacing the symbolic address with an actual or relative address. If there is not an unresolved reference, the flow continues at block 408. Otherwise, the flow continues at block 406.

As shown in block 406, the unresolved reference is replaced with a reference to the loader unit. For example, the loader unit 206 replaces the unresolved reference with a reference to itself. That is, the loader unit 206 replaces the unresolved reference with an actual address in the loader unit's address space. In one embodiment, the reference to the loader unit 206 is a reference to instructions contained within the loader unit 206. Although the loader unit 206 replaces the unresolved reference, it also stores the unresolved reference, so it can resolve the unresolved reference at runtime. The flow continues at block 408.

At block 408, the executable object module is loaded. For example, the loader unit 206 loads the executable object module into the execution unit 208. From block 408, the flow ends.

As noted above, FIG. 5 is a more detailed description of the operation described in block 310 of FIG. 3. FIG. 5 is a flow diagram illustrating operations for loading a needed object module, according to exemplary embodiments of the invention. The operations of the flow diagram 500 will be described with reference to the exemplary system of FIG. 2. The flow diagram 500 commences at block 502.

At block 502, a reference to a symbol that is in a separate object module is received. For example, the loader unit 206 receives a reference to a symbol that is in a separate object module (e.g., object module 214A). The loader receives this symbol reference because it replaced the unresolved reference with a reference to itself (see discussion of block 406 above). The flow continues at block 504.

As shown in block 504, the symbol is found in the one of the object modules. For example, the loader unit 206 finds the symbol in one of the object modules (e.g., object module 214A or object module 214B) of the application program. In one embodiment, the loader unit 206 searches each object module of the list of needed object modules (see description of FIG. 3 above) to find the symbol. The flow continues at block 505.

At block 505, the object module that includes the symbol is loaded. For example, the loader unit 206 loads the object module that includes the symbol into the execution unit 208. The flow continues at block 506.

At block 506, it is determined whether there is data to be fetched. For example, the loader unit 206 determines whether data is to the fetched. In one embodiment, for example, if the symbol is a variable, the variable value must be fetched. Alternatively, if the symbol is a call to a function that has no parameters, there is no data to fetch. If there is data to fetch, the process continues at block 508. Otherwise, the process continues at block 510.

At block 508, the needed data is fetched. For example, the loader unit 206 fetches the needed data. As a more specific example, the loader unit 206 fetches the needed data (e.g., variable values) from a data segment of the object module. From block 508, the process continues at block 510.

At block 510, execution is resumed. For example, the execution unit 208 resumes execution by executing the newly loaded object module. From block 510, the process ends.

While the discussion above describes various operations for loading and executing object modules, the discussion of FIG. 6 describes an exemplary object module format.

FIG. 6 is a block diagram illustrating an object module, according to exemplary embodiments of the invention. According to embodiments of the invention, the compiler unit 204 creates object modules in the format described below. In one embodiment, the object modules can contain references to other object modules, where some of the references are unresolved at runtime. In one embodiment, the loader unit 206 resolves the object module's unresolved references at runtime. As shown in FIG. 6, the object module 600 includes a header 602, load commands 604, and data 606. The header 602 identifies the file as an executable object module and contains basic file type information. The basic file type information includes information indicating the target processor architecture and flags specifying options that affect the manner in which other parts of the object module 600 are interpreted.

As shown in FIG. 6, the load commands 604 include segment commands (shown as segment command 1 and segment command 2), which specify the layout and linkage characteristics of the object module 600. According to embodiments of the invention, the load commands can include any number of segments. The load commands can include information such as the initial layout of the object module in virtual memory, and the location of a symbol table, which can be used by the loader unit 206 when resolving symbol references. The load commands can also include the initial execution state of the main program thread and the names of shared libraries that contain definitions for the executable's imported symbol. According to embodiments, the loader unit 206 can use the shared library names for resolving external references. As shown in FIG. 6, the data includes two segments 610 (shown as segment 1 and segment 2). As shown in FIG. 6, segment 1 includes three sections. In particular, segment 1 includes section 1 data, section 2 data, and section 3 data. Segment 2 includes four sections. In particular, segment 2 includes section 4 data, section 5 data, section 6 data, and section 7 data. Although segments 1 and 2 include those sections shown in FIG. 6, the segments can contain zero to any number of sections. Each segment defines a region of virtual memory that the loader unit can use to map into the address space of the application program. In one embodiment, the load commands and file type specify the exact number and layout of the segments and sections.

Methods of the Invention

Figure 7:
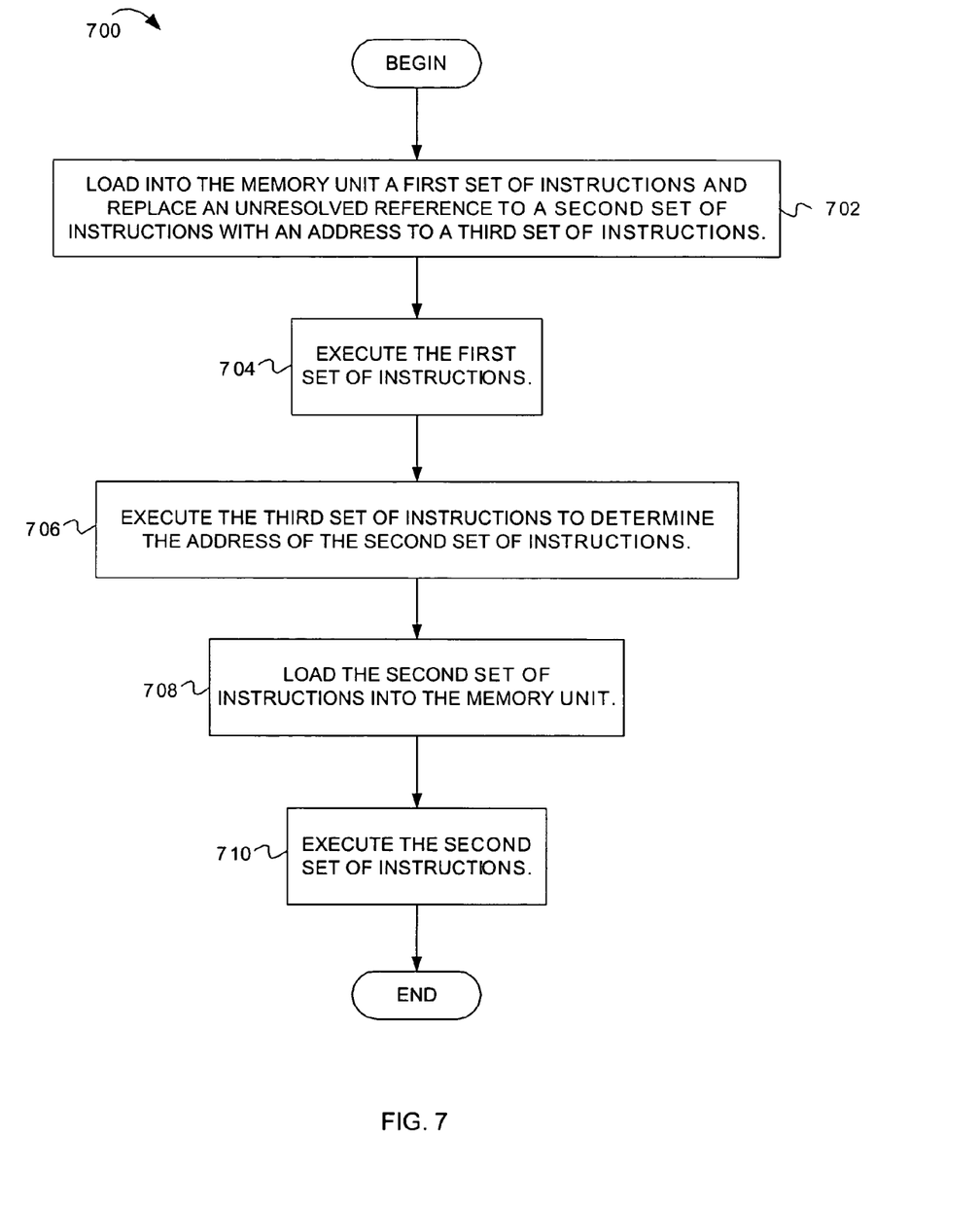
FIG. 7 is a flow diagram illustrating operations for loading and executing instructions, according to exemplary embodiments of the invention.
Figure 8:
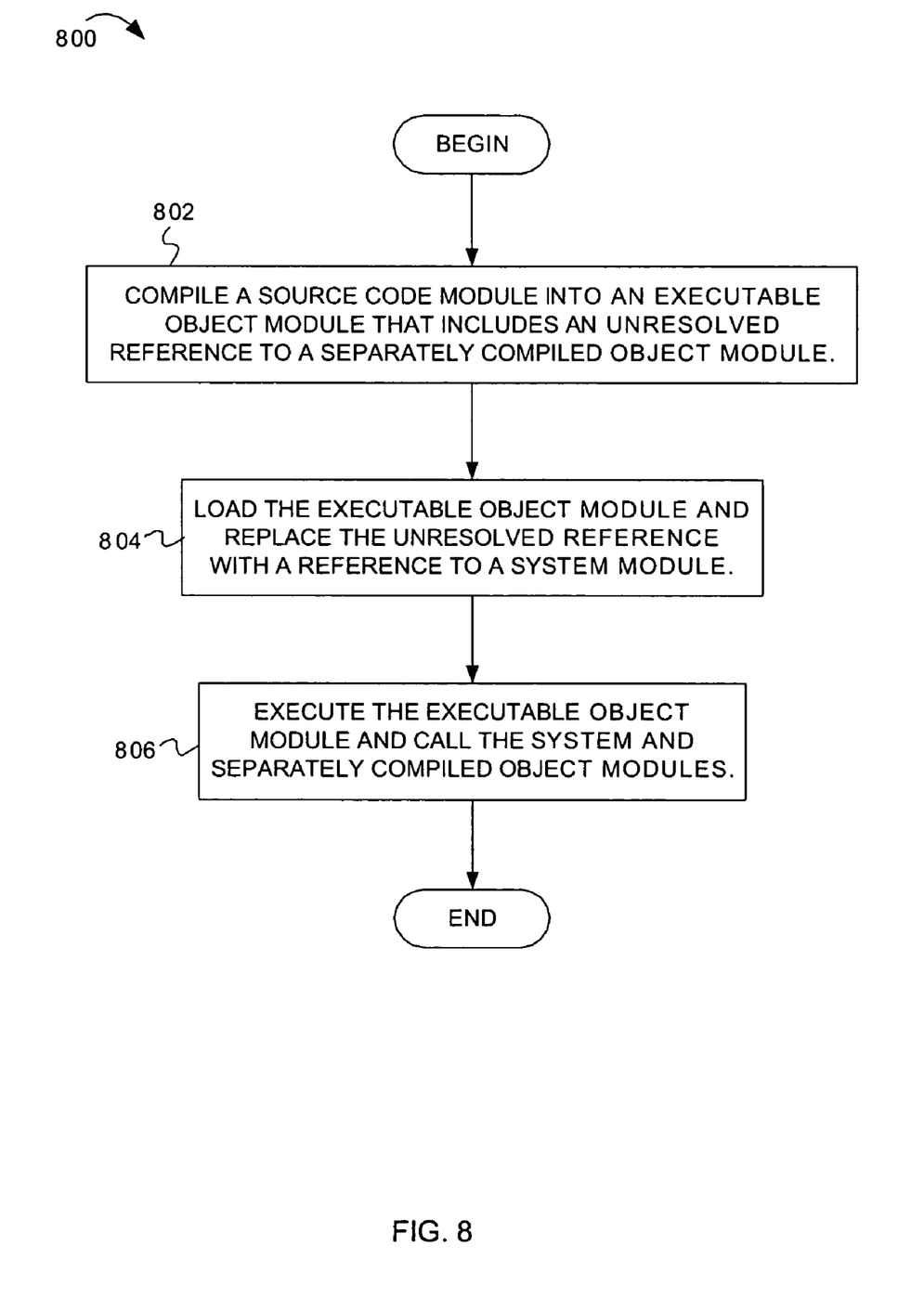
FIG. 8 is a flow diagram illustrating operations for compiling, loading, and executing the computer program, according to exemplary embodiments of the invention.
Figure 9:
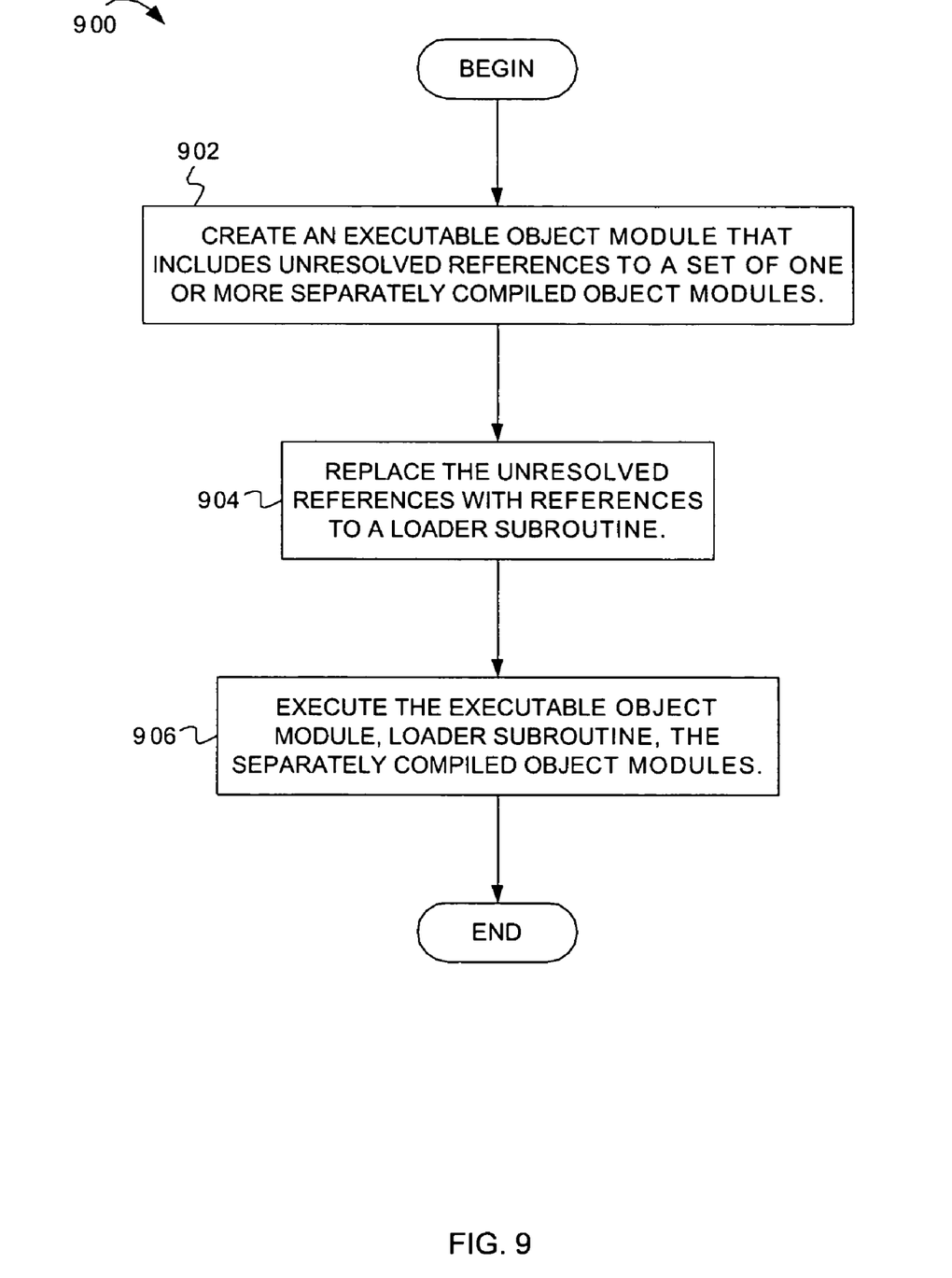
FIG. 9 is a flow diagram illustrating operations for creating and executing object modules, according to exemplary embodiments of the invention.

This section describes methods performed by embodiments of the invention. In certain embodiments, the methods are performed by instructions stored on machine-readable media (e.g., software), while in other embodiments, the methods are performed by hardware or other logic (e.g., digital logic). In this section, FIGS. 7-9 will be discussed. FIGS. 7-9 describe operations for creating, loading, and executing object modules.

FIG. 7 is a flow diagram illustrating operations for loading and executing instructions, according to exemplary embodiments of the invention. The flow diagram 700 describes operations performed by various embodiments of the invention. In one embodiment, the operations are performed by an operating system. In another embodiment, the operations are performed by a software development tool. In yet another embodiment, the operations are performed by a software development tool working in concert with an operating system.

The flow 700 commences at block 702. At block 702, a memory unit is loaded with a first set of instructions (e.g., an executable object module) and an unresolved reference to a second set of instructions (e.g., another object module) is replaced with a reference to a third set of instructions (e.g., a loader unit). From block 702, the flow continues at block 704. At block 704, the first set of instructions is executed. The flow continues at block 706. At block 706, the third set of instructions (e.g., the loader unit) is executed to determine the address of the second set of instructions. The flow continues at block 708. At block 708, the second set of instructions is loaded into the memory unit. From block 708, the flow continues at block 710. At block 710, the second set of instructions is executed. From block 710, the flow ends.

FIG. 8 is a flow diagram illustrating operations for compiling, loading, and executing a computer program, according to exemplary embodiments of the invention. According to embodiments of the invention, the operations of the flow diagram 800 are performed by components of a software development tool. In another embodiment, the operations are performed by a software development tool working in concert with an operating system. The flow diagram 800 begins at block 802.

At block 802, a source code module is compiled into an executable module that includes an unresolved reference to a separately compiled object module. From block 802, the process continues at block 804. At block 804, the object module is loaded and the unresolved reference is replaced with a reference to a the dynamic loader 206. The flow continues at block 806. At block 806, the executable object module is executed and the system module and separately compiled object module are called. From block 806, the flow ends.

FIG. 9 is a flow diagram illustrating operations for creating and executing object modules, according to exemplary embodiments of the invention. In one embodiment, these operations are performed by an operating system. In another embodiment, the operations are performed by a software development tool. In yet another embodiment, the operations are performed by a software development tool working in concert with an operating system. The flow diagram 900 begins at block 902.

At block 902, an executable object module is created. The executable object module includes unresolved references to a set of one or more separately compiled object modules. The flow continues at block 904. At block 904, the unresolved references are replaced with references to a loader subroutine. The flow continues at block 906. At block 906, the executable object module, loader subroutine, and separately compiled object modules are executed. From block 906, the process ends.

Hardware and Operating Environment

This section provides an overview of the exemplary hardware and the operating environment in which embodiments of the invention can be practiced.

FIG. 10 illustrates an exemplary computer system used in conjunction with certain embodiments of the invention. As illustrated in FIG. 10, computer system 1000 comprises processor(s) 1002. The computer system 1000 also includes a memory unit 1030, processor bus 1022, and input/output controller hub (ICH) 1024. The processor(s) 1002, memory unit 1030, and ICH 1024 are coupled to the processor bus 1022. The processor(s) 1002 may comprise any suitable processor architecture. The computer system 1000 may comprise one, two, three, or more processors, any of which may execute a set of instructions in accordance with embodiments of the present invention.

The memory unit 1030 includes a compiler unit 204 and a loader unit 206. The memory unit 1030 stores data and/or instructions, and may comprise any suitable memory, such as a dynamic random access memory (DRAM), for example. The computer system 1000 also includes IDE drive(s) 1008 and/or other suitable storage devices. A graphics controller 1004 controls the display of information on a display device 1006, according to embodiments of the invention.

The input/output controller hub (ICH) 1024 provides an interface to I/O devices or peripheral components for the computer system 1000. The ICH 1024 may comprise any suitable interface controller to provide for any suitable communication link to the processor(s) 1002, memory unit 1030 and/or to any suitable device or component in communication with the ICH 1024. For one embodiment of the invention, the ICH 1024 provides suitable arbitration and buffering for each interface.

For one embodiment of the invention, the ICH 1024 provides an interface to one or more suitable integrated drive electronics (IDE) drives 1008, such as a hard disk drive (HDD) or compact disc read only memory (CD ROM) drive, or to suitable universal serial bus (USB) devices through one or more USB ports 1010. For one embodiment, the ICH 1024 also provides an interface to a keyboard 1012, a mouse 1014, a CD-ROM drive 1018, one or more suitable devices through one or more firewire ports 1016. For one embodiment of the invention, the ICH 1024 also provides a network interface 1020 though which the computer system 1000 can communicate with other computers and/or devices.

In one embodiment, the computer system 1000 includes a machine-readable medium that stores a set of instructions (e.g., software) embodying any one, or all, of the methodologies for dynamically loading object modules described herein. Furthermore, software can reside, completely or at least partially, within memory unit 1030 and/or within the processor(s) 1002.

Thus, a system and method for dynamically loading object modules have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A method comprising:
    loading a first set of instructions into an execution unit, wherein the first set of instructions includes an unresolved reference to a second set of instructions, wherein the loading includes replacing the unresolved reference with an address of a third set of instructions without loading the third set of instructions into the execution unit when loading the first set of instructions and without loading the second set of instructions into the execution unit when loading the first set of instructions;
    executing instructions of the first set by the execution unit; and
    executing instructions of the third set, wherein executing instructions of the third set includes loading the second set of instructions into the execution unit; and
    executing instructions of the second set by the execution unit.

2. The method of claim 1, wherein the first set of instructions includes an executable object module.

3. The method of claim 2, wherein the executable object module is in the Mach-O object format.

4. The method of claim 1, wherein the second set of instructions includes a separately compiled object module.

5. The method of claim 1, wherein the third set of instructions includes a loader unit.

6. The method of claim 1, wherein the loading does not include determining whether the unresolved reference refers to a defined external symbol.

7. A method comprising:
  compiling a source code module into an executable object module that includes an unresolved reference to a separately compiled object module;
  loading the executable object module, wherein the loading includes replacing the unresolved reference with a reference to a system module without loading instructions of the system module, the system module separate from the executable object module, and wherein neither the compiling nor the loading include determining whether the unresolved reference refers to a defined external symbol; and
  executing the executable object module, wherein the executing includes calling the system module for loading the separately compiled object module as needed at runtime such that the separately compiled object module is loaded without being loaded when loading the executable object module and executing the separately compiled object module.

8. The method of claim 7, wherein the system module includes a loader unit.

9. The method of claim 8, wherein the loader unit is a dyld loader.

10. The method of claim 7, wherein the source code module includes instructions of a dialect of the C programming language.

11. The method of claim 7, wherein the executable object module is in the Mach-O object format.

12. A method comprising:
  creating an executable object module that includes symbolic references to addresses in ones of a set of one or more separately compiled object modules, wherein the executable object module includes a page-aligned code segment and a page-aligned data segment, and wherein the object module includes resolved internal code-to-data offsets;
  replacing, in the executable object module, the symbolic references with addresses to a loader subroutine without instructions of the loader subroutine in the executable object module; and
  executing the executable object module, wherein executing includes executing the loader subroutine to load one of the separately compiled object modules as needed at runtime such that the one separately compiled object module is loaded without being loaded when loading the executable object module and executing the one of the separately compiled object modules.

13. The method of claim 12, wherein the executable object module is in the Mach-O object format.

14. The method of claim 12, wherein the loader subroutine is included in a dynamic loader, and wherein the dynamic loader is dyld.

15. The method of claim 12, wherein the unresolved reference is a reference is a function call to a function included in one of the separately compiled object modules of the set.

16. The method of claim 12, wherein the unresolved reference is a reference to a variable defined within one of the separately compiled objects of the set.

17. An apparatus comprising:
  a compiler unit to create an executable object module based on a source code module, wherein the executable object module includes an unresolved reference to a separately compiled object module;
  a storage unit to store the executable object module;
  an execution unit to receive the executable object module; and
  a loader unit to find the executable object module in the storage unit and present the executable object module to the execution unit, wherein the loader unit is configured to replace the unresolved reference with a reference to a system module without loading instructions of the system module, the system module separate from the executable object module, the loader unit separate from the executable object module and configured to load the separately compiled object module as needed at runtime such that the separately compiled object module is loaded without being loaded when loading the executable object module, and wherein the loader unit is not to determine whether the unresolved reference refers to a defined external object module.

18. The apparatus of claim 17, wherein the source code module includes instructions that are of a dialect of the C programming language.

19. The apparatus of claim 17, wherein the executable object module is in the Mach-O object format.

20. The apparatus of claim 17, wherein the compiler unit compiles Objective C programming language instructions.

21. An apparatus comprising:
  a loader unit to load a first set of instructions into a memory unit, wherein the first set of instructions includes an unresolved reference to a second set of instructions, the loader unit to replace the unresolved reference with an address of a third set of instructions without the third set of instructions, the first set of instructions being different from the second set of instructions and the third set of instructions such that the loader unit is operable to load the first set of instructions without loading the third set of instructions and without loading the second set of instructions when loading the first set of instructions; and
  an execution unit to execute instructions of the first set, the execution unit also to execute instructions of the third set to determine an address of the second set of instructions, wherein the loader unit is configured to use the address of the second set of instructions to load the second set of instructions into the memory unit.

22. The apparatus of claim 21, wherein the first set of instructions is an executable object module.

23. The apparatus of claim 21, wherein the executable object module is in the Mach-O object format.

24. The apparatus of claim 21, wherein the second set of instructions is a separately compiled object module.

25. The apparatus of claim 21, wherein the third set of instructions is a loader module.

26. A system comprising:
  a memory unit, the memory unit including, a compiler unit to create an executable object module based on a source code module, wherein the executable object module includes a symbolic reference to a separately compiled object module;
  a loader unit to present the executable object module for execution, wherein the loader unit is configured to replace the symbolic reference with an address to a system module to link the executable object module and the separately compiled object module such that instructions of the loader unit are separate from the executable object module and the separately compiled object module, the loader unit configured to load the separately compiled object module as needed at runtime such that the separately compiled object module is loaded without being loaded when loading the executable object module, and wherein the loader unit is not to determine whether the symbolic reference refers to a defined external object module; and a processor to receive the executable object module from the loader unit of the memory unit.

27. The system of claim 26, wherein the source code module includes instructions that are of a dialect of the C programming language.

28. The system of claim 26, wherein the executable object module is in the Mach-O object format.

29. The system of claim 26, wherein the compiler unit compiles C programming language instructions.

30. A machine-readable storage medium that provides instructions, which when executed by a machine, cause the machine to perform operations comprising:

loading a first set of instructions into an execution unit, wherein the first set of instructions includes an unresolved reference to a second set of instructions, wherein the loading includes replacing the unresolved reference with an address of a third set of instructions without loading the third set of instructions into the execution unit and without loading the second set of instructions into the execution unit when loading the first set of instructions;

executing instructions of the first set; and executing instructions of the third set, wherein executing instructions of the third set includes loading instructions of the second set into the execution unit and executing instructions of the second set.

31. The machine-readable medium of claim 30, wherein the first set of instructions includes an executable object module.

32. The machine-readable medium of claim 31, wherein the executable object module is in the Mach-O object format.

33. The machine-readable medium of claim 30, wherein the loading does not include determining whether the unresolved reference refers to a defined external symbol.

34. The machine-readable medium of claim 30, wherein the second set of instructions includes a separately compiled object module.

35. The machine-readable medium of claim 30, wherein the third set of instructions includes a loader unit.

36. A machine-readable storage medium that provides instructions, which when executed by a machine, cause the machine to perform operations comprising:

compiling a source code module into an executable object module that includes an unresolved reference to a separately compiled object module;

loading the executable object module, wherein the loading includes replacing the unresolved reference with a reference to a system module without loading instructions of the system module, and wherein neither the compiling nor the loading include determining whether the unresolved reference refers to a defined external symbol; and executing the executable object module, wherein the executing includes calling the system module for loading the separately compiled object module as needed at runtime such that the separately compiled object module is loaded without being loaded when loading the executable object module and executing the separately compiled object module.

37. The machine-readable medium of claim 36, wherein the determining the address includes looking-up the address in a master symbol table.

38. The machine-readable medium of claim 36, wherein the source code module includes instructions of a dialect of the C programming language.

39. The machine-readable medium of claim 36, wherein the system module is a loader module.

40. The machine-readable medium of claim 36, wherein the executable object module is in the Mach-O object format.

41. A machine-readable storage medium that provides instructions, which when executed by a machine, cause the machine to perform operations comprising:

creating an executable object module that includes unresolved references to a set of one or more separately compiled object modules, wherein the executable object module includes a page-aligned code segment and a page-aligned data segment, and wherein the object module includes resolved internal code-to-data offsets;

replacing, in the executable object module, the unresolved references with references to a loader subroutine without instructions of the loader subroutine in the executable object module; and executing the executable object module, wherein executing includes, executing the loader subroutine to load one of the separately compiled object modules and as needed at runtime such that the one separately compiled object module is loaded without being loaded when loading the executable object module executing the one of the separately compiled object modules.

42. The machine-readable medium of claim 41, wherein the executable object module is in the Mach-O object format.

43. The machine-readable medium of claim 41, wherein the loader subroutine is included in a dynamic loader, and wherein the dynamic loader is dyld.

44. The machine-readable medium of claim 41, wherein the unresolved reference is a reference is a function call to a function included in one of the separately compiled object modules of the set.

45. The machine-readable medium of claim 41, wherein the unresolved reference is a reference to a variable defined within one of the separately compiled objects of the set.

* * * * *